Jan. 19, 1937.  W. ZEINDLER  2,068,160
CASTER WHEEL
Filed Jan. 20, 1936
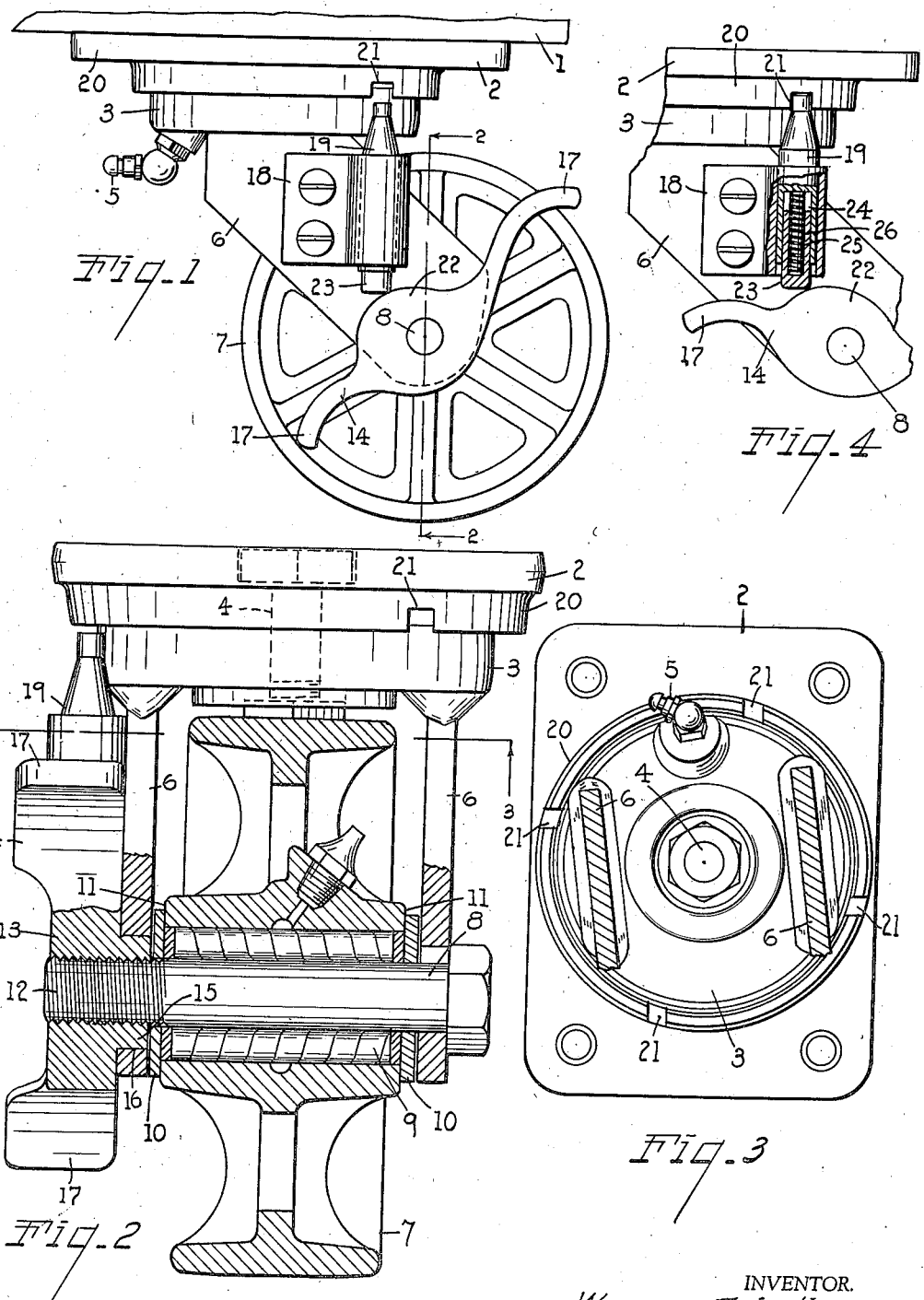
INVENTOR.
Werner Zeindler
BY Chappell, Earl T. Chappell
ATTORNEYS Patented Jan. 19, 1937

2,068,160

UNITED STATES PATENT OFFICE 2,068,160

CASTER WHEEL

Werner Zeindler, Albion, Mich., assignor to Service Caster & Truck Company, Albion, Mich.

Application January 20, 1936, Serial No. 59,827

9 Claims. (Cl. 16—35)

This invention relates to improvements in caster wheels.

The main objects of this invention are:

First, to provide a caster wheel for work benches, tables, racks, tool cabinets, and various other purposes in which the wheel standard may be quickly locked against rotative movement and a brake applied to the wheel simultaneously or by means of a single actuating member.

Second, to provide a caster wheel having a bolt for locking the wheel standard against rotative movement with an actuating means which can be actuated with the wheel in any position, the locking taking place at a predetermined position or positions.

Third, to provide a caster wheel having the above specified features of advantage which is comparatively simple and economical in structure.

Objects relating to details and economies of the invention will appear from the description to follow. The invention is defined and pointed out in the claims.

A preferred embodiment of the invention is illustrated in the accompanying drawing, in which:

Fig. 1 is a fragmentary side elevation of a caster wheel embodying the features of my invention.

Fig. 2 is an enlarged detail view partially in vertical section on a line corresponding to line 2—2 of Fig. 1.

Fig. 3 is a horizontal section on line 3—3 of Fig. 2, parts being omitted, only the base member and wheel standard being shown.

Fig. 4 is a fragmentary view partially in section showing the bolt in its projected or locking position.

In the accompanying drawing, 1 represents a part mounted on the caster wheel. My improved caster wheel comprises a base member 2 on which the wheel standard 3 is mounted or swiveled for rotative movement, the standard pivot being shown at 4. It will be understood that in practice suitable bearing members are interposed between the head of the standard and the base member, a grease gun nipple for this bearing being shown at 5.

The forks or arms 6 of the wheel standard are spaced to receive the wheel 7 between them, this wheel being mounted on the spindle 8 extending between the forks, a suitable roller bearing 9 being provided in this embodiment.

Friction brake disks 10 are arranged at the inner sides of the forks of the standard to coact with the ends of the wheel hub 11.

The spindle 8 is in the form of a bolt having a threaded end 12 on which the hub 13 of the lever 14 is threaded, the hub of the lever having a part 15 projecting through the opening 16 in the adjacent arm of the standard so that when the lever is rotated or rocked on the spindle, the hub of the lever will clamp the brake disks upon the hub, thus actuating the brake. The lever has oppositely projecting foot pieces or portions 17 so that the lever may be actuated in both directions by the foot.

By means of a suitable bracket 18 on the side of the standard, I mount a bolt 19 in alignment with the annular flange 20 of the base member. This annular flange has a plurality of downwardly facing notch or recess-like keepers 21 adapted to receive the bolt when it is in alignment therewith, as shown in Fig. 4. The bolt is retracted by gravity and is actuated to engaging position by means of the cam 22 on the lever 14. This cam 22 engages the cam follower 23 reciprocating in the bore 24 in the lower end of the bolt, a coiled spring 25 being arranged in the bore 24 and a bore 26 in the follower so that it acts to urge the bolt and follower in opposite directions. This arrangement permits the actuation of the lever 14 without regard to the position of the bolt relative to the keepers. If it is actuated when out of alignment with a keeper, the bolt will engage the flange 20 and the bolt will swivel or rotate until a keeper is aligned with the bolt when the bolt will snap into engagement thereby locking the standard against rotative or swiveling movement, and through the means described, the brake is applied to the wheel.

The structure is highly desirable for use on factory trucks, benches, racks, cabinets, and the like and permits the effective locking of the wheel to provide stability for anchoring the object carried. It will be noted that the keepers are preferably positioned so that the wheel is disposed at a slight angle and this with the application of the brake, provides a very effective anchoring of the object.

I have shown only one wheel but it will be understood that on factory benches, racks cabinets, and the like there are at least two and frequently four caster wheels.

I have illustrated and described my improvements in an embodiment which I have found highly satisfactory. I have not attempted to illustrate or describe certain adaptations or improvements which I contemplate as it is believed that this embodiment will enable those skilled in the art to which my invention relates, to adapt or embody the same as may be desired.

Having thus described my invention, what I claim as new and desire to secure by Letters Patent, is:

1. In a caster, the combination with a base member provided with an annular downwardly facing flange having keeper recesses therein, of a wheel, a forked wheel standard swiveled on said base member, a spindle for said wheel carried by said standard forks and threaded at one end, a friction brake disk disposed on said spindle within said forks to coact with said wheel, a vertically disposed bolt mounted on said wheel standard in alignment with said flange of said base member, and an actuating lever threaded upon said wheel spindle to coact with said brake disk and provided with a bolt actuating cam, said bolt being provided with a cam follower, there being a spring interposed between the cam follower and the bolt whereby the lever may be actuated when the bolt is out of alignment with a keeper recess and the bolt will be projected into a recess when brought into alignment therewith by the swiveling movement of the wheel standard.

2. In a caster, the combination with a base member provided with an annular downwardly facing flange having keeper recesses therein, of a wheel, a wheel standard swiveled on said base member, a spindle for said wheel carried by said standard, a friction brake disk disposed on said spindle to coact with said wheel, a vertically disposed bolt mounted on said wheel standard in alignment with said flange of said base member, and an actuating lever mounted on said wheel spindle to coact with said brake disk and provided with a bolt actuating cam, said bolt being provided with a cam follower, there being a spring interposed between the cam follower and the bolt whereby the lever may be actuated when the bolt is out of alignment with a keeper recess and the bolt will be projected into a recess when brought into alignment therewith by the swiveling movement of the wheel standard.

3. In a caster, the combination with a base member provided with an annular downwardly facing flange having keeper recesses therein, of a wheel, a forked wheel standard swiveled on said base member, a spindle for said wheel carried by said standard forks and threaded at one end, a vertically disposed bolt mounted on said wheel standard in alignment with said flange of said base member, and an actuating lever threaded upon said wheel spindle and provided with a bolt actuating cam.

4. In a caster, the combination with a base member provided with an annular downwardly facing flange having keeper recesses therein, of a wheel, a wheel standard swiveled on said base member, a spindle for said wheel carried by said standard, a vertically disposed bolt mounted on said wheel standard in alignment with said flange of said base member, and an actuating lever mounted on said wheel spindle and provided with a bolt actuating cam.

5. In a caster, the combination with a base member provided with a keeper, a wheel, a wheel standard rotatably mounted on said base member, a spindle for said wheel, a brake member for said wheel, a bolt mounted on said standard to coact with said keeper, and an actuating lever for said bolt and brake member mounted upon said wheel spindle to coact with said brake member and provided with a bolt actuating cam, said bolt being provided with a cam follower, there being a spring interposed between the cam follower and the bolt whereby the lever may be actuated when the bolt is out of alignment with a keeper recess and the bolt will be projected into a recess when brought into alignment therewith by the swiveling movement of the wheel standard.

6. In a caster, the combination with a base member provided with a keeper, a wheel, a wheel standard rotatably mounted on said base member, a spindle for said wheel, a brake member for said wheel, a bolt mounted on said standard to coact with said keeper, and an actuating lever for said bolt and brake member mounted upon said wheel spindle.

7. In a caster, the combination with a base member provided with an annular downwardly facing flange having spaced keeper recesses therein, of a wheel, a wheel standard swiveled on said base member, a vertically disposed bolt mounted on said wheel standard in alignment with said flange of said base member, and a pivoted actuating lever provided with a bolt actuating cam, said bolt being provided with a cam follower, there being a spring interposed between the cam follower and the bolt whereby the lever may be actuated when the bolt is out of alignment with the keeper recess and the bolt will be projected into a keeper recess when brought into alignment therewith by the swiveling movement of the wheel standard.

8. In a caster, the combination with a base member provided with an annular downwardly facing flange having spaced keeper recesses therein, of a wheel, a wheel standard swiveled on said base member, a vertically disposed bolt mounted on said wheel standard in alignment with said flange of said base member, and a bolt actuating member, there being a spring interposed between the actuating member and bolt whereby the actuating member may be actuated when the bolt is out of alignment with the keeper recess and the bolt will be projected into a keeper recess when brought into alignment therewith by the swiveling movement of the wheel standard.

9. In a caster, the combination with a base member, of a recess-like keeper, a wheel, a wheel standard swiveled on said base member, a bolt for locking said wheel standard against swiveling movement, and a pivoted actuating lever provided with a bolt actuating cam, said bolt being provided with a cam follower, there being a spring interposed between the cam follower and the bolt whereby the lever may be actuated when the bolt is out of alignment with the keeper recess and the bolt will be projected into a keeper recess when brought into alignment therewith by swiveling movement of the wheel standard.

WERNER ZEINDLER.